UNITED STATES PATENT OFFICE.

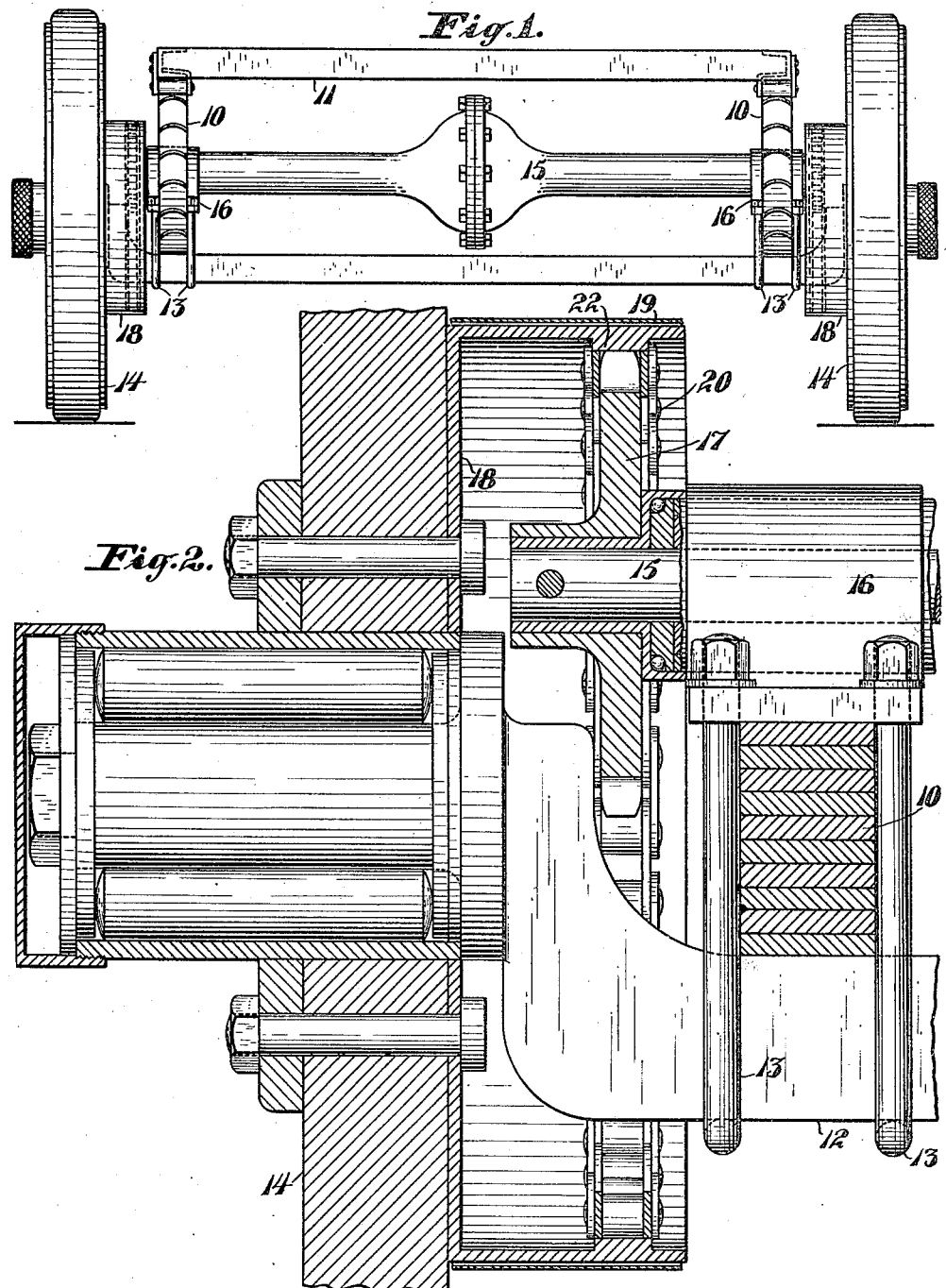

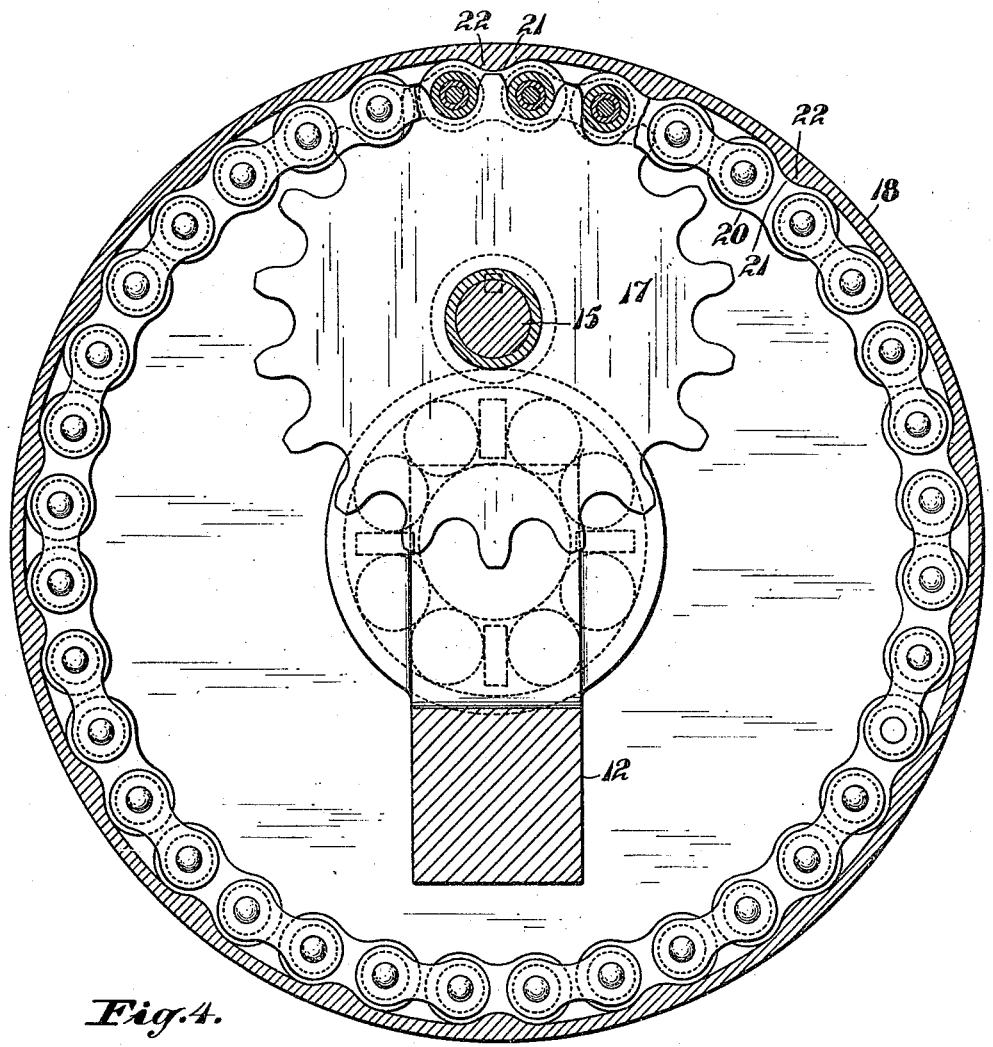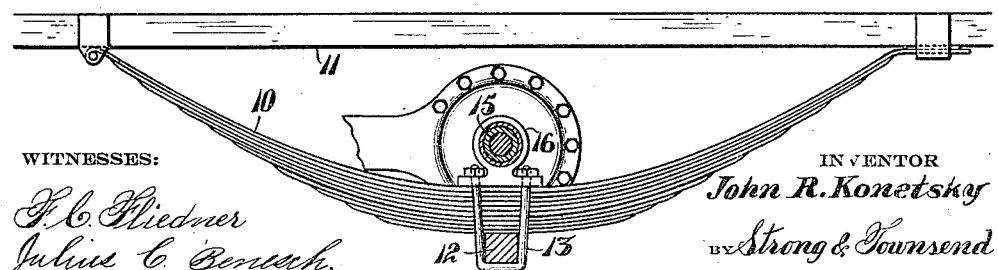

JOHN R. KONETSKY, OF SAN FRANCISCO, CALIFORNIA.

FINAL DRIVE FOR MOTOR-TRUCKS.

1,293,123.   Specification of Letters Patent.   Patented Feb. 4, 1919.

Application filed June 27, 1917. Serial No. 177,215.

*To all whom it may concern:*

Be it known that I, JOHN R. KONETSKY, a citizen of the United States, residing in the city and county of San Francisco and State of California, have invented new and useful Improvements in Final Drives for Motor-Trucks, of which the following is a specification.

This invention relates to final drives for self-propelled vehicles, more particularly to the converted motor trucks, that is, a motor truck made by lengthening the frame of an automobile and installing new rear wheels and supporting axle.

The object of this invention is to simplify and improve the construction and operation of the final driving mechanism for vehicles of this type.

The converting of automobiles into motor trucks has become a general practice. Usually the old rear axle is employed as a jack shaft and from here a chain runs back to the rear wheels for driving the latter. Such drives are unsatisfactory on account of dirt and dust getting on to the chains and causing early destruction and quick wearing of the parts. Also stretching of the chain is productive of much trouble. In the present invention I reposition the rear differential axle so that it comes directly above the dead axle beneath the extended frame and is supported thereby and provide the ends of the differential axle with driving wheels which engage with internal teeth on the drums carried by the wheels, said drums preferably carrying brake bands on their exterior. A novel and advantageous form of tooth is provided for the internal gear, this being in the form of a sprocket chain fixed about the inner circumference of the drum and held in place therein against relative circumferential movement. The driving wheels meshing therewith are in the form of sprocket wheels and thereby I obtain all the advantages of a sprocket chain drive with no stretching of the chain or gathering of dirt thereon. By relocating the rear differential axle directly over the dead axle, the usual torsion rods may be dispensed with and the cost of constructing and assembling the parts is considerably reduced.

One form which my invention may assume is exemplified in the following description and illustrated in the accompanying drawings, in which—

Figure 1 shows a rear elevation of rear wheels and driving mechanism of a motor truck embodying my invention.

Fig. 2 shows a detail sectional view of the sprocket driving wheel and internal gear employed in the driving mechanism.

Fig. 3 shows a circumferential sectional view of the same.

Fig. 4 shows a sectional elevation of the rear portion of the motor truck.

Referring to the drawings in detail, I show rear springs 10, preferably semi-elliptical, carrying the extended frame 11 of the motor truck and supported intermediately upon a dead axle 12 and retained in place thereon by means of clip bolts 13. This axle 12 has supporting wheels 14 and is preferably dropped to provide room above for the differential driving axle 15 which is supported in bearings 16 resting upon the central portions of the springs 10 and held in place by means of the clip bolts 13. The drive from the motor to the axle 15 is by means of a shaft, being the same as in the case of an automobile, except that the shaft has been lengthened.

Upon each end of the axle 15 is a sprocket wheel 17 in position to engage with novel internal teeth on drums 18 fixed to the supporting wheels. Each drum preferably carries an exterior brake band 19 and serves the purpose of a brake drum. The form of internal teeth on the drums is such as to preserve all of the advantages of a chain drive in the matter of evenness of wear and ease of fit with none of the usual disadvantages, such as stretching of the chain or clogging and filling up with dirt. The teeth are made by arranging a sprocket chain 20 on the interior of the drum, the links of which chain have grooved sides 21 receiving projections 22 on the annulus of the drum. The chain exactly fills the inner circumference of the drum and cannot be flexed inwardly on account of the fact that a toggle lock is formed when any joint in the articulated chain is moved toward the center. The projections 22 entering the depressions in the chain effectually prevent circumferential movement of the chain relative to the drum. The result of this construction is that the teeth may be easily and quickly and cheaply renewed when worn and the wear falling upon the driving wheels is less than would occur if the usual spur teeth were made use of. This form of gear is much more silent than the usual internal gear drive.

The present drive offers a strong rugged construction with fewer parts than are employed in prior drives for this purpose.

Various changes in the construction and arrangement of the several parts herein shown and described may be employed without departing from the spirit of the invention as disclosed in the appended claims.

Having thus described my invention, what I claim and desire to secure by Letters Patent is:

1. An internal gear comprising a drum and a sprocket chain carried on the inner face of said drum and entirely filling the space within and held against relative circumferential movement by means of projections on the drum entering depressions in the links of the chain, the links of said chain forming internal teeth.

2. An internal gear comprising a drum adapted to be rotatably supported and a sprocket chain positioned within said drum to lie against and around the inner face of the drum, said inner face of the drum having seats formed therealong, whereby the chain will be accommodated and will be held against movement in relation thereto, said chain adapted to be engaged by a sprocket circumscribed by the drum and in mesh with the chain.

3. An internal gear comprising a drum, positioning lugs extending inwardly from its inner circumferential face and at equal intervals therearound, and a roller sprocket chain adapted to conform to said face and be held by the lugs, whereby internal gear teeth will be formed by the rollers of the chain.

In testimony whereof I have hereunto set my hand in the presence of two subscribing witnesses.

JOHN R. KONETSKY.

Witnesses:
G. M. BALL,
JOHN H. HERRING.

Copies of this patent may be obtained for five cents each, by addressing the "Commissioner of Patents. Washington, D. C."